Patented June 10, 1952

2,600,218

UNITED STATES PATENT OFFICE 2,600,218

VEGETABLE FERTILIZERS

Cyril James Dew, London, England

No Drawing. Application November 7, 1949, Serial No. 126,057. In Great Britain November 23, 1948

5 Claims. (Cl. 71—23)

This invention has reference to improvements in vegetable fertilisers and method of producing the same. It is known that substitutes for stable manure are made up from a basic vegetable matter broken down to a rotted state by stacking and damping, this being the well-known compost method. To attain and hasten the most suitable state for spreading and use, it is usual to apply various chemical and other agents in conjunction with the vegetable litter which encourages the bacteria which assist this breakdown and rotting process. There are several well known substances which can be used, such as sulphate or ammonia, calcium cyanamide, urea, various herbal compounds, urine, fowl droppings, stable manure, and so on, and for the basic vegetable matter, straw is frequently used.

The amount of labour and the space required to make successful compost is considerable, and the object of this invention is to overcome these difficulties.

When cereals have been threshed it is a fairly common practice for the straw to be packed and compresed mechanically into bales of a standard size, and in certain cases a conveyor is employed to carry the straw to the baling machine. For example, in some cases, a conveyor connects the straw discharge of a threshing machine to a stationary baling machine so that threshing and baling is a continuous process. In most cases, however, where a stationary baling machine is used there is a conveyor leading thereto on which the straw is loosely carried, and at or near the end of the conveyor which discharges and feeds into the baler, the individual straws lie loosely heaped so that practically all or substantially all the individual straws become exposed and accessible to any preparations—gaseous, liquid or pulverulent—which may be applied thereto, particularly from an overhead direction. The result is that the compressed bales can quite easily be made up from straw intended to be used as basic vegetable matter for compost in which all or substantially all of the individual stalks have been pre-treated with a requisite agent of the kind and for the purpose hereinbefore described.

According to the present invention, a material for use in the preparation of a solid vegetable fertiliser by the well-known compost method comprises straw in the form of a substantially dry compressed bale in which all or substantially all the individual straws or stalks making up the bale have been treated prior to baling with a substance adapted to encourage rotting on the application of water.

When baling straw normally the farmer ensures that the straw is as dry as possible before baling so that the finished bales, when stacked and stored, will not deteriorate owing to the presence of insufficient moisture inside the bale, that is, moisture below the rotting level, and this normal or usual degree of dryness is meant by the description "substantially dry" in the preceding paragraph which has been found sufficient to hold back any rotting which only takes place in subsequent compost preparation when water is applied to bring the moisture content above the rotting level.

By the use of a material according to the invention and in the baled form described, large quantities of a complete compost combination can be stacked in a barn or the like readily available when required, capable of easy and convenient transport to the compost heap and the process of breaking down into a fertile compost can be accomplished merely by the addition of water to the broken open and still unscattered bale. The bale may, in fact, remain completely unopened and undivided during the "breaking down," although the object of the invention is achieved equally well if the bale be opened, and even scattered.

The addition of the agent to the travelling straw may be accomplished by spraying or sprinkling the agent in the form of a solution, powder or gas, and the amount can be easily adjusted so that a requisite quantity of the agent is supplied to a predetermined bulk of straw. The small amount of liquid which might be added to the bale in this process of preparation, either as a solution or as a wetting agent, will not be sufficient to cause any considerable breakdown of the straw and the result will be that the treated bale can be held in stock by the merchant, retailer or user for any period. It takes some months to complete the composting process and the user would anticipate the time at which he would want to use the compost and apply water a certain predetermined period beforehand. The simplest way to do this would be to dispose the bales in the open, and allow the rain to augment any water artificially applied.

In one embodiment of carrying out the invention, a solution of any suitable agent is sprayed on to the straw as it travels on the conveyor to the baling machinery, and a proportion of an inert adhesive, or one with fertilising properties may be included in the solution to prevent the bale shedding too much of the agent when the latter has dried out, and the bale is in transport.

Water runs very easily off the shiny surface of the straw, and to ensure that any moisture applied is retained on the straw, a wetting or spreading agent can be added to the water or solution. This will also facilitate the subsequent wetting of the straw. In a variation of this embodiment, a pulverulent agent is blown on to the straw, and the latter is previously, subsequently or simultaneously treated with an adhesive, either inorganic or organic, which may be part of a solution or in powder form applied before or mixed with the pulverulent agent.

A practical embodiment of the invention with a more particular description of substances and amounts will be described by way of example.

Above the conveyor feeding a stationary baling machine a spray mouth is erected leading from a power-operated blower, fed with pulverulent calcium cyanamide, so that a fog of the cyanamide is spread across the width of the conveyor and settles on the travelling straw. The weight of straw passing the spraying area in a given time, and the rate of feed of the cyanamide, is calculated so that approximately 80 lbs. of cyanamide is applied to every ton of straw. Alongside the cyanamide sprayer either ahead or in rear of the same with respect to the travel of the straw, or both ahead and in rear, there is a liquid sprinkler which may be gravity fed from an overhead tank, or preferably pump-fed, the pump being driven advantageously by the same engine which drives the aforesaid blower. This sprinkler system supplies water made into an adhesive solution by the addition of 2½% by weight of synthetic resin.

With a so-called "pick up baler" the foregoing method would be modified such as by providing the baler with supplies of the cyanamide or the like and the adhesive solution, and fitting sprayers and sprinklers at appropriate positions thereon so as to treat the loose straw en route to the baler.

While the straw of cereals has been referred to herein, it is to be understood that the word "straw" is intended to include, for the purpose of this invention, any kinds of vegetable stalks or stems and similar litter capable of baling (such as esparto grass), because practically all vegetable matter of this description may be used as the, or as one of the, basic vegetable matters in the preparation of fertilisers by the compost method.

Straw is used as a cattle food and to enable the bales of treated straw, according to the invention, to be recognised, the bales may be distinguished in any suitable manner, such as by adding colouring matter to the straw during the application of the cyanamide or the like, or by employing a distinctively coloured bale-binding string or the like.

I claim:

1. A composition of matter comprising a substantially dry compressed bale of straw containing a uniform dispersion of a pulverent rot-promoting agent and an inert adhesive for effecting adherence of the said agent to the straw, said composition having a moisture content below the rotting level so as to remain inactive until such time as it is desired to activate rotting by the addition of water to increase the moisture content above the rotting level.

2. A composition of matter comprising a substantially dry compressed bale of straw containing a uniform dispersion of pulverized calcium cyanamide and an inert adhesive for effecting adherence of the calcium cyanamide to the straw, said composition having a moisture content below the rotting level so as to remain inactive until such time as it is desired to activate rotting by the addition of water to increase the moisture content above the rotting level.

3. A composition of matter comprising a substantially dry compressed bale of straw containing a uniform dispersion of a pulverized rot-promoting agent and an inert adhesive resin for effecting adherence of the rot-promoting agent to the straw, said composition having a moisture content below the rotting level so as to remain inactive until such time as it is desired to activate rotting by the addition of water to increase the moisture content above the rotting level.

4. A composition of matter comprising a substantially dry compressed bale of straw containing a uniform dispersion of pulverized calcium cyanamide and an inert adhesive resin for effecting adherence of the calcium cynamide to the straw, said composition having a moisture content below the rotting level so as to remain inactive until such time as it is desired to activate rotting by the addition of water to increase the moisture content above the rotting level.

5. The method comprising applying to loose dry straw a rot-promoting agent in finely divided form dispersed in an inert vehicle having adhesive properties so as to cause the agent to adhere to the straw and then promptly baling the resulting composition in the absence of extraneous water sufficient to raise the moisture content above the rotting level.

CYRIL JAMES DEW.

REFERENCES CITED

The following references are of record in the file of this patent:

UNITED STATES PATENTS

| Number | Name | Date |
|---|---|---|
| 1,900,614 | Poirot | Mar. 7, 1933 |
| 2,101,807 | Corey | Dec. 7, 1937 |
| 2,150,164 | Heath et al. | Mar. 14, 1939 |
| 2,218,695 | Leatherman | Oct. 22, 1940 |

FOREIGN PATENTS

| Number | Country | Date |
|---|---|---|
| 4,869 | Sweden | Feb. 28, 1893 |
| 252,039 | Great Britain | May 17, 1926 |
| 492,596 | Great Britain | Sept. 19, 1938 |